Oct. 12, 1937.  F. M. GIFFEN  2,095,635
SILENCING DEVICE
Filed April 13, 1933  2 Sheets-Sheet 1
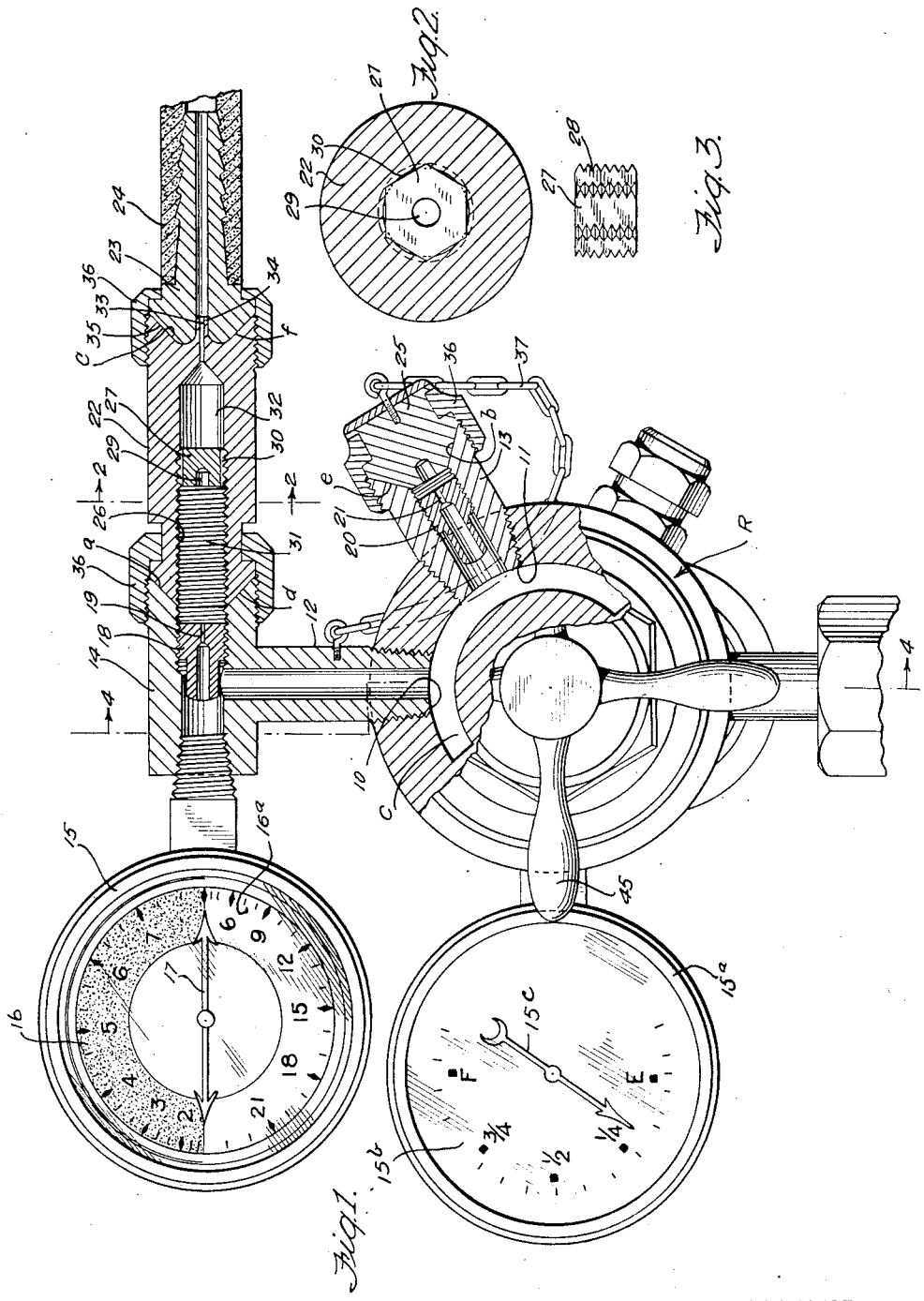
INVENTOR
FLORIN M. GIFFEN
BY
 Treuewald
ATTORNEY Oct. 12, 1937.　　　F. M. GIFFEN　　　2,095,635
SILENCING DEVICE
Filed April 13, 1933　　　2 Sheets-Sheet 2

INVENTOR.
FLORIN M. GIFFEN.
BY
ATTORNEY

Patented Oct. 12, 1937

2,095,635

UNITED STATES PATENT OFFICE 2,095,635

SILENCING DEVICE

Florin M. Giffen, Union, N. J., assignor, by mesne assignments, to Union Carbide and Carbon Corporation, a corporation of New York Application April 13, 1933, Serial No. 665,966

16 Claims. (Cl. 181—47)

This invention relates to silencing devices; and more particularly to devices utilized for silencing a gas flowing from a container or other source through a restricted metering orifice. This invention is particularly applicable to instances in which the flow of gases is regulated under conditions in which any noise caused by the means utilized for such regulation is objectionable; and the invention also provides for a substantially silent discharge of gas over a wide volumetric range under selective control of an operator.

In recent years, developments in the therapeutic use of oxygen have made it desirable to provide for the discharge of the gas from its container at various volumes per unit of time over a wide range. For example, the administration of oxygen to a patient by means of nasal catheters placed in the nostrils or by means of a face inhaler placed over the nose and mouth and the maintenance of proper atmospheric conditions in a tent placed about a patient's bed require a comparatively small volumetric discharge from the gas container while the use of oxygen for initially purging a room or tent of undesirable gases requires a comparatively large volumetric discharge if it is to be effective. With heretofore known apparatus used for this purpose, it has been impossible to indicate the desired range of discharge on the scale of an ordinary gauge so as to render a single gauge usable for all such purposes and there are serious objections to the use of a plurality of gauges differently calibrated to supplement each other in providing the desired range with a single container, both because of the additional expense and the confusion incident to such use. Such an arrangement is also objectionable on account of the cumbersomeness of the apparatus and the lack of compactness thereof.

It is desirable, therefore, and an important object of this invention to provide, in apparatus of the above character, improved means whereby reading of a wide range of volumetric rates of discharge from a container may be made on the scale facilities of a single, ordinary, standard gauge.

It is also desirable in the use of such apparatus and particularly in therapeutic applications thereof, to provide against all noises caused by the escaping gas that may be annoying to a patient, such as the monotonous hissing or sputtering sounds usual with the discharge of a gas from a container through metering and other devices.

It is, therefore, an additional and important object of the invention to provide, in connection with discharge apparatus connected with a container, simple, inexpensive, compact and otherwise improved means for silencing or damping out and substantially eliminating all objectionable sounds due to the escaping gas; and another object is to provide such means which preferably is adjustable so as to be able to more effectively silence the sounds made by the gas and to adapt the same to sounds of various pitch which may be set up under different conditions of gas discharge.

Apparatus in accordance with this invention may comprise a pressure regulator adapted to be connected to the discharge port of a gas tank or other container and having a pair of outlet ports provided with orifices and a gauge for indicating volumetric rate of discharge through said orifices; one of the orifices being preferably calibrated to read directly on the dial indications of an ordinary gauge and the other orifice to read in multiples of such indications. There may also be provided in connection with such apparatus, a silencer or muffler selectively connectable to the outlet ports for deadening or damping out sounds caused by the escaping gas and, if desired, the muffler may be provided with adjustable means for adapting it to greatly reduce or nullify sounds of various pitch. A distributing conduit and a closure plug may be provided which are adapted to be connected to the outlet which is in use and the outlet which is not in use, respectively. The silencer may also be adapted to be connected between the distributing conduit and the outlet in use.

The above and other objects and novel features of the invention will be apparent from the following description taken with the accompanying drawings, in which Fig. 1 is a view in front elevation partially in section, of discharge apparatus constructed in accordance with this invention.

Fig. 2 is a cross sectional view of the silencer, on an enlarged scale compared with Fig. 1 and taken on line 2—2 of Fig. 1, showing the relation of the adjustable plug or baffle within the silencer tube to the walls of the bore thereof.

Fig. 3 is a detail view of the adjustable plug on the same scale as Fig. 2.

Figure 4:
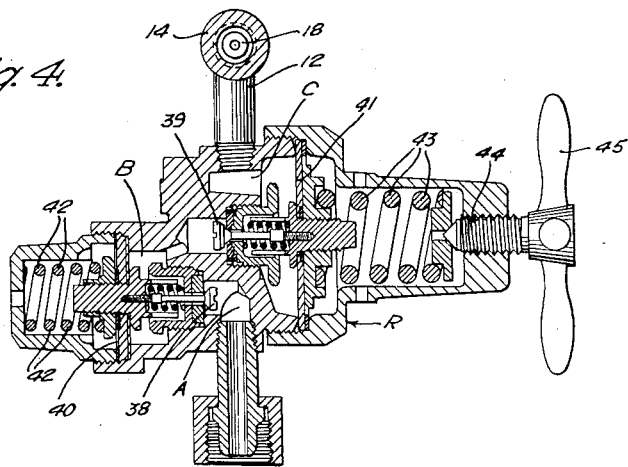
Fig. 4 is a sectional view taken on line 4—4 of Fig. 1 and on a reduced scale, showing the arrangement of mechanism in a two stage regulator suitable for use in the apparatus of Fig. 1.

The invention is illustrated in the accompanying drawings as applied to a two stage pressure regulator adapted to be connected to a gas tank. It is understood, however, that application of the invention may be made wherever the rate of flow of gas through a passage or conduit is to be volumetrically indicated and wherever it is desirable to silence the sounds incident to such flow; whether used with regulators or not or whether such regulators are of one or more than one stage. It is also to be understood that while the regulator herein illustrated has only two outlet ports, having orifices calibrated so that the rate of flow through one may be read directly on the dial indications of a gauge and the rate of flow through the other in multiples of such indications, a greater number of ports may be provided having orifices calibrated each to a different multiple of the dial indications.

As shown in Fig. 1 of the drawings, there is provided in the wall of the low pressure chamber C of the two stage pressure regulator R a pair of outlet ports 10 and 11 in which are connected tubular conduits 12 and 13; conduit 12 discharging into a transversely positioned pipe 14 connected intermediate its ends to the end of conduit 12. To one end of the transverse pipe 14 is connected a low pressure gauge 15 having a graduated scale 16 and a pointer 17 for indicating volumetric rate of flow of gas from the low pressure chamber C of the regulator. A second gauge 15a may also be provided connected to the high pressure chamber of the regulator to indicate the pressure in a cylinder of compressed gas to which the regulator may be connected.

The pipe 14 is also provided with a metering spud 18 threaded into the bore thereof and axially adjustable therein; the spud being formed with a constricted metering orifice 19 to permit escape of the gas; this orifice being preferably calibrated so that the volumetric rate of escape of gas therethrough will read directly on the scale 16 of the gauge in liters per unit of time; pressure in chamber C being selectively determined by setting the regulator R by means of handle 45. The orifice 19 may be calibrated if so desired, to read on multiples of the indications of the scale 16. The conduit 13 connected in port 11 is also provided with a metering spud 20 threaded in the bore thereof and adjustable axially of said bore; the escape orifice 21 of this latter spud being calibrated so that the volume of gas escaping therethrough in unit time may be read in multiples of the indications of the scale 16 of the gauge. In order to facilitate reading of the multiple indications for the orifice 21, there may be provided on the pressure gauge, a second scale 16a, the graduations of which correspond to those of scale 16 and are numbered to be read in multiples of the readings of scale 16. The pointer 17 may, for this purpose, be double headed as shown.

By this arrangement of two outlet ports for gas one of which provides an escape orifice calibrated in a multiple of that of the other, it appears that the range of volumetric rate readings that may be made upon a gauge used in connection with the low pressure chamber of a regulator may be materially extended since the distributing apparatus used in connection with the regulator may be interchangeably connected with pipe 14, when a small volumetric rate of discharge of gas is desired, and with conduit 13, when a discharge of considerable volume is desired.

Connected with the end of the pipe 14 opposite to that to which the gauge is connected, there may be provided a silencer or muffler 22 for reducing the volume of or entirely eliminating the sounds which usually accompany escaping gases. This silencer or muffler comprises a tubular member, suitably adapted at one end for connection to the end of pipe 14 and at its other end for attachment to a hose connection 23 to which a suitable distributing conduit 24, as a flexible hose, may be attached.

The convex end surfaces a and b of the silencer 22, and the plug 25, respectively, are adapted to interfit with the concave surfaces d and e of the outlet conduits 14 and 13, so that the silencer or plug may be connected with either outlet. These surfaces are preferably conical in shape. The end-surfaces f of the silencer and c of the distributing conduit are identical in contour, and a portion of this contour has the same shape as the surfaces d and e so that the distributing conduit may be connected to either of the outlets without the inter-positioning of the silencer.

The silencer 22, hose connection 23 and plug 25 are each provided with union nuts 36 swiveled thereto and by which they may be connected with the parts to which they are adapted, as set forth above, and the plug is flexibly connected to the apparatus as by a chain 37 so as to prevent it from getting lost and to keep it conveniently at hand; the connection between the chain and plug being preferably in the nature of a swivel.

By this arrangement the distributing apparatus may be used interchangeably with either of the metering spuds 18 or 20 and the rate of discharge therethrough may be read on the gauge either directly or in multiples of the indications thereon according to which of the conduits 12 or 13 the distributing apparatus is connected to; flow of gas through the other conduit meanwhile being cut off by the plug 25.

Ordinarily, the silencer is left connected to the pipe 14 when the distributing conduit 23 is transferred from the connection with conduit 10 through pipe 14 as shown in Fig. 1 to the connection with conduit 11, since the use of the apparatus when the distributing conduit 23 is connected with conduit 13 is not usually such that noise is an important factor; such use being ordinarily the purging of a room or enclosure, after which oxygen may be supplied thereto at a lower volumetric discharge rate through conduit 12.

However, there are circumstances under which it is desirable to use the silencer with the distributing apparatus attached to conduit 13 and the associated metering spud 20, in which case, the noise made by escaping gas through this conduit and the spud 20 may be of a different pitch from that made by gas escaping through conduit 12 and its associated spud 18. For this reason and in order to render the silencer adjustable to overcome noises of various pitch within the same conduit, the bore of the silencer may be threaded as shown at 26 and a plug or baffle 27 may be provided therein which is preferably hexagonal in shape having threads 28 at its corners adapted to coact with the threads of the bore so as to enable the plug to be adjusted axially of the bore. It will be understood that while the plug is shown as of hexagonal cross-section, it may be of any other polygonal cross-section, fluted on its edges or of such other shape as will provide for the passage of gas therepast between its peripheral surface and that of the silencer. The plug is provided with a central recess 29 in one face thereof into which a rod or other suitable tool may be projected for effecting this adjustment; friction between the rod and sides of the recess being sufficient to insure turning movement, since the engagement of the threads of the plug with those of the bore is but slight.

The plug when intermediately placed in the bore of the silencer divides the bore into two chambers and gas is discharged into the first chamber 31 through the constricted aperture 19 of the metering spud 18, expands, and then passes through the constricted orifices 30 formed peripherally of the plug 27 and provided by the peculiar shape of the plug and the wall of the bore and expands again into the second chamber 32 from which it escapes through the constricted orifice 33 at the end of the silencer to which the distributing conduit 23 is attached. The orifice 33 may extend through a projecting nozzle 34 formed at the end of the silencer which is adapted to project into the bore of the hose coupling 23. The nozzle 34 is surrounded by a channel lying between the nozzle and an annular lip 35 concentric therewith, and the rear end of the hose connection is shaped to fit snugly in this channel. For quiet operation, the end of the nozzle 34 should be flush with or extend beyond the end face of the silencer of which it is a part, or this nozzle may be omitted altogether.

The regulator R is, as stated above, preferably of a two stage variety such as disclosed in the copending application of R. J. Kehl and H. W. Jones, Serial No. 600,313 in order that the mechanism of the gauge may be protected against sudden shock and in order that the gas may be delivered to the distributing apparatus with a dependably even flow. Such apparatus is shown in section in Fig. 4 of the drawings, and consists briefly of a high pressure or gas inlet chamber A, an intermediate pressure chamber B, and a low pressure chamber C, separated from each other and having connecting passages controlled by valves 38 and 39; the valves being under automatic control of diaphragms 40 and 41 which are respectively responsive to the gas pressure in chambers B and C. The pressure at which valve 38 will open is determined by the compression of spring 42 acting against diaphragm 40, and that at which valve 39 will open is determined by the compression of spring 43 adapted for manual adjustment through screw 44 and handle 45 connected therewith. By turning of this handle, the operator may regulate the pressure of gas in chamber C so as to maintain the volumetric discharge from chamber C at the desired flow; being guided in his manipulations by the reading on the gauge 15.

Figure 5:
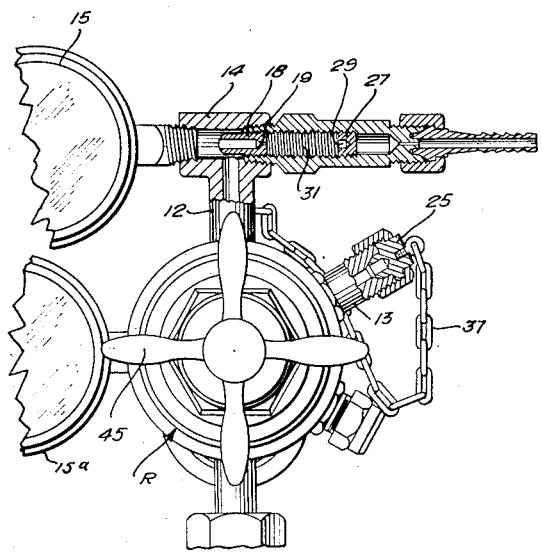
Fig. 5 is a view on the same scale as Fig. 4, and partially in section, showing the construction of the apparatus including the silencer as it may be constructed for use with only one of the outlet ports of the apparatus.

Apparatus somewhat varied in construction from that described in detail above is disclosed in Fig. 5 of the drawings. This form of apparatus is adapted to conditions where there is no necessity of changing the silencer from the conduit of lower to that of higher volumetric discharge. In such cases the silencer may remain connected with the pipe 14 and the spud 18 may be threaded into the bore of the silencer as shown in this figure instead of into the bore of pipe 14.

In adjusting the silencer to eliminate the sound of escaping gas, the plug or baffle 27 may be moved axially of the bore of the silencer, or under certain circumstances, the plug may be permanently located and adjustment of the spud at the end of the silencer may be depended upon for tuning the apparatus. To permanently locate the plug 27, the threads 26 may terminate at a predetermined point and the walls of the passage thus form a stop for the plug.

The present construction of silencer, it will appear, is quite simple, is economical of space and involves no serious manufacturing or maintenance problems. It is readily and simply adjustable to various conditions and is effective to a high degree as a sound eliminator. The apparatus, as a whole, eliminates the necessity of a plurality of gauges for reading over the desired range and therefore reduces materially the cost and cumbersomeness of the same.

It is to be understood that various changes in construction, and adaptations of the principles as herein set forth in addition to those stressed above, are possible within the scope of this invention and that the invention is to be limited only by the terms of the claims broadly construed and the prior art.

I claim:

1. A device for silencing sound in gas passing therethrough, comprising the combination of conduit means provided with a bore for the passage of gas therethrough; a member disposed in said bore and having a restricted metering orifice through which the gas passes and tends to produce sound in passing therethrough; and means disposed within said bore and operatively interposed between said member and the outlet end of said bore for eliminating sound caused by such gas passing through said orifice.

2. Apparatus for connection between a source of gas supply and a distributing conduit, comprising a conduit having a passage constricted at one end thereof, a member disposed in the other end of said passage and having a restricted metering orifice, and means disposed in said passage between said member and said constricted end for eliminating sounds caused by gas passing through said metering orifice, said member and said means being adjustable lengthwise of said passage.

3. A device for use in silencing gas escaping through an orifice, comprising the combination of conduit means having a bore therethrough; a member disposed in said bore and having a restricted metering orifice through which gas passes and tends to produce sound; and means in said bore operatively interposed between said member and the outlet of said bore for causing the sound waves to interfere so as to silence the sound.

4. Apparatus for connection between a source of gas supply and a distributing conduit, comprising conduit means having a passage therethrough; a member disposed in the inlet portion of the passage and having a restricted metering orifice through which the gas passes at substantially constant pressure and tends to produce sound; and means disposed in said passage for producing silence in gases passing therethrough, said means being adjustable so as to silence sounds of various pitch.

5. A silencing device for an orifice outlet of a gas container which comprises in combination, a tube; a plug member intermediate the ends of the bore thereof; and a member having such an orifice and disposed in one end of said bore; each of said members being adjustable to eliminate sound within the bore.

6. A silencing device for an orifice outlet of a gas container which comprises, in combination, a tube; a plug member intermediate the ends of the bore thereof; and a member having such an orifice and disposed in one end of said bore; said plug member being adjustable lengthwise of the tube to provide silence in gas escaping through the orifice.

7. A silencer for connection with an orifice outlet of a gas chamber comprising, in combination, a tubular member having a threaded bore and a member threaded into the bore and adjustable lengthwise from a single end thereof.

8. A silencer for connection with the outlet of a gas chamber comprising, in combination, conduit means having a bore constricted at both ends, one of the constrictions being adapted to form an orifice tending to produce sounds due to passage of gas therethrough and a member within the bore adjustable lengthwise thereof for tuning out sounds in gases escaping through such orifice.

9. A muffler for silencing sound in gas passing therethrough which comprises, in combination, a tubular member having a bore with constricted ends and openings therethrough which are centrally placed, one of said openings being adapted to form an orifice tending to produce sound due to the passage of gas therethrough; and a member in the bore intermediate its ends providing peripheral passages connecting the bore on opposite sides of the member.

10. Apparatus for use in silencing the sound of gas passing through a restricted metering orifice, comprising conduit means having a passage provided with a restricted outlet, a plug provided with such an orifice disposed in said passage, and a member constricting said passage thereby providing expansion chambers between said plug and said constricting member and between said constricting member and the restricted outlet of said passage.

11. Apparatus for connection between a source of gas supply and a distributing conduit, comprising conduit means having a passage restricted at the discharge end, a plug having an orifice tending to produce sounds due to the passage of gas therethrough, said plug being inserted in the inlet end of said passage and adjustable lengthwise thereof, and a member within said passage and disposed between said plug and said restricted end for constricting said passage, said constricting member being adapted to form alternate expanded and constricted portions of said passage so as to silence such sounds.

12. Apparatus according to claim 11 in which said constricting member comprises a plug of polygonal cross section adapted to provide a plurality of channels between its periphery and the wall of said passage.

13. Apparatus according to claim 11 in which said constricting member is adjustable lengthwise of said passage.

14. Apparatus according to claim 11 in which said conduit means comprises a single tubular member.

15. A silencer for connection with an orifice outlet of a gas chamber comprising, in combination, a tubular member having a threaded bore and a member threaded into the bore and adjustable lengthwise from a single end thereof, said last-named member being adapted to provide a plurality of channels between its periphery and the wall of the bore.

16. Apparatus for connection between a source of gas supply and a distributing conduit, comprising a conduit having a passage therethrough; a member having a restricted metering orifice and inserted within said passage, such orifice tending to produce sounds due to the passage of gas therethrough; and a second member disposed within said passage for silencing such sounds, said passage having walls formed so as to provide a stop adapted to prevent the positioning of said second member beyond a predetermined point.

FLORIN M. GIFFEN.